(12) United States Patent
Hunziker

(10) Patent No.: US 7,974,658 B2
(45) Date of Patent: Jul. 5, 2011

(54) METHOD AND SYSTEM FOR SUBTERRANEAN WIRELESS DATA TRANSMISSION BETWEEN AT LEAST ONE MOBILE STATION AND A FIXED NETWORK BY MEANS OF A RADIO NETWORK

(75) Inventor: Christoph Hunziker, Oberentfelden (CH)

(73) Assignee: Licania GmbH (CH)

( * ) Notice: Subject to any disclaimer, the term of this patent is extended or adjusted under 35 U.S.C. 154(b) by 993 days.

(21) Appl. No.: 11/884,395

(22) PCT Filed: Feb. 14, 2006

(86) PCT No.: PCT/CH2006/000099
§ 371 (c)(1),
(2), (4) Date: Aug. 15, 2007

(87) PCT Pub. No.: WO2006/086906
PCT Pub. Date: Aug. 24, 2006

(65) Prior Publication Data
US 2008/0159244 A1 Jul. 3, 2008

(30) Foreign Application Priority Data

Feb. 15, 2005 (DE) .......................... 10 2005 006 987
Jun. 24, 2005 (DE) .......................... 10 2005 029 749
Aug. 19, 2005 (DE) .......................... 10 2005 039 575

(51) Int. Cl.
*H04L 12/00* (2006.01)
*H04B 1/38* (2006.01)

(52) U.S. Cl. ......... 455/561; 455/423; 455/424; 370/338

(58) Field of Classification Search ................. 455/561, 455/423, 424; 370/338
See application file for complete search history.

(56) References Cited

U.S. PATENT DOCUMENTS

| 3,949,353 A * | 4/1976 | Waters et al. ................... 367/36 |
| 5,546,397 A | 8/1996 | Mahany |

(Continued)

FOREIGN PATENT DOCUMENTS

| EP | 1276341 A1 | 1/2003 |
| FR | 2831760 A1 | 5/2003 |
| WO | 01/63825 A2 | 8/2001 |

*Primary Examiner* — Lewis G West
*Assistant Examiner* — Gennadiy Tsvey
(74) *Attorney, Agent, or Firm* — The Webb Law Firm

(57) ABSTRACT

The invention relates to a method and a system, for subterranean wireless data transmission between at least one mobile station and affixed network by means of a radio network for the monitoring and control of subterranean moving machines. The fixed network comprises a number of fixed base stations embodied as access points, each base station being connected to the fixed network by means of at least one data transmission connection, preferably by cable. Each base station and the mobile station comprise a transceiver device and the data transmission between the mobile station and the fixed network is achieved in a wireless manner over the radio network via at least one base station. On an interruption to the data transmission connection between the fixed network and a base station and/or on interruption of the radio connection between the mobile station and the base station, a data transmission between the mobile station and the fixed network is achieved via the separate base station and at least one further base station connected to the fixed network by means of an uninterrupted data transmission connection.

11 Claims, 1 Drawing Sheet

U.S. PATENT DOCUMENTS

| | | |
|---|---|---|
| 6,278,877 B1 * | 8/2001 | Brederveld et al. ............ 455/434 |
| 6,411,691 B1 * | 6/2002 | Pasdeloup et al. ....... 379/102.04 |
| 6,564,052 B1 * | 5/2003 | Kawano et al. ............... 455/424 |
| 6,654,362 B1 * | 11/2003 | Palamara ...................... 455/437 |
| 6,674,403 B2 * | 1/2004 | Gray et al. ..................... 342/463 |
| 2002/0098868 A1 * | 7/2002 | Meiksin et al. ............... 455/560 |

* cited by examiner

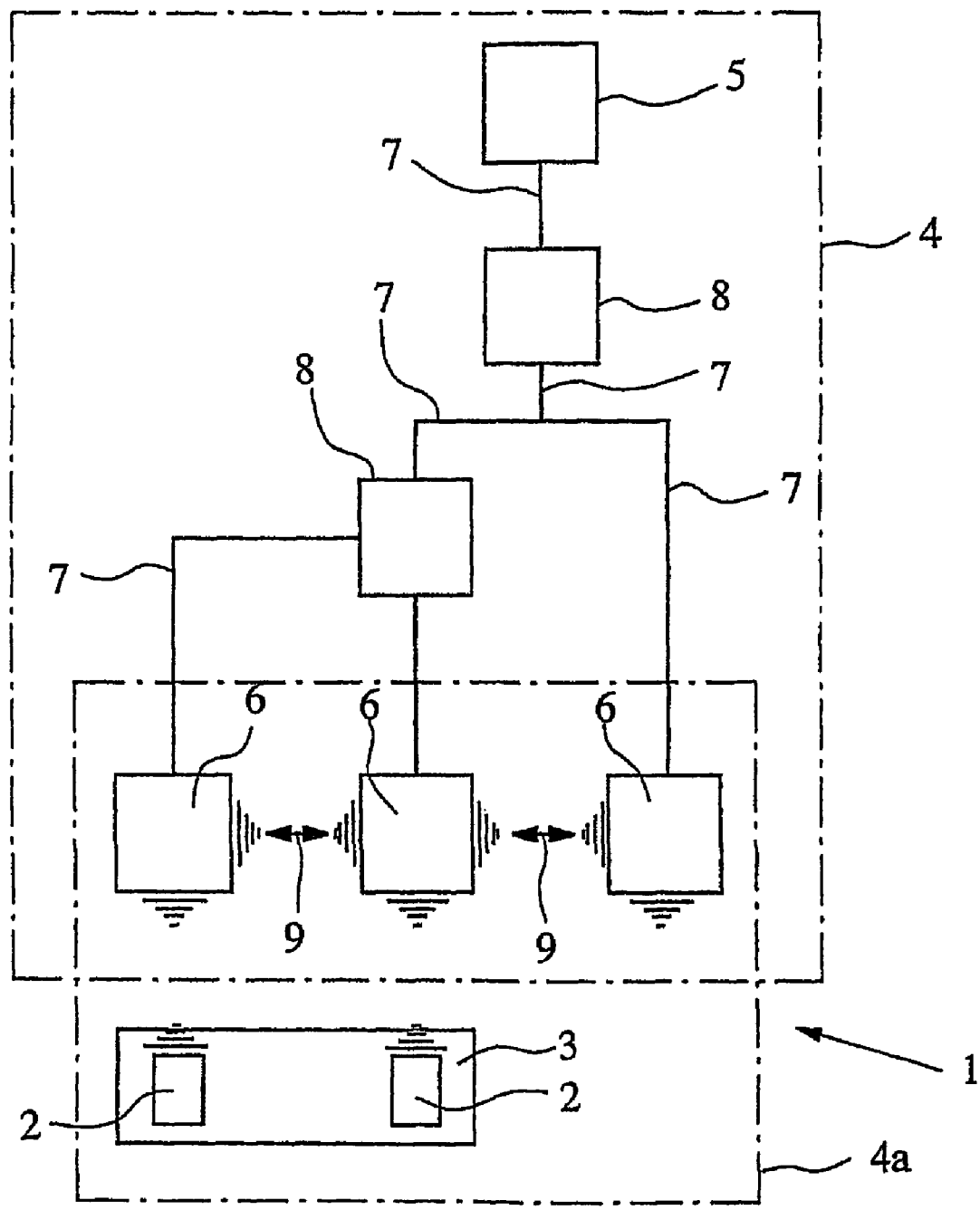

METHOD AND SYSTEM FOR SUBTERRANEAN WIRELESS DATA TRANSMISSION BETWEEN AT LEAST ONE MOBILE STATION AND A FIXED NETWORK BY MEANS OF A RADIO NETWORK

The invention relates to a method and a system for subterranean wireless data transmission between at least one mobile station and a fixed network by means of a radio network, preferably using a WLAN with the IEEE 802.11 standard, particularly for monitoring and controlling subterranean moving machines, wherein the fixed network comprises a number of fixed base stations preferably embodied as access points, each base station being connected to the fixed network by means of at least one data transmission connection, preferably by a cable, wherein each base station and the mobile station in each case comprise at least one transceiver device and the data transmission between the mobile station and the fixed network is effected wirelessly in the radio network via at least one base station.

Wireless communication underground is traditionally preferably carried out by means of UHF devices which can be operated within the range of fixed antennas. These are constructed either as directional antennas or as slotted-cable antennas, so-called leaky feeders. Systems are also known which operate with digital systems in the GHz range such as, for example, on the basis of GSM technology. All aforementioned systems represent special developments and are comparatively costly in comparison with standard methods of communication above ground. For this reason, technologies have increasingly appeared in recent years which are based on modern methods of wireless network technology. In these technologies, wireless local area networks (WLANs) are used. The standardization of these WLANs currently comprises five WLAN standards which are combined in the IEEE 802.11 series of standards. In addition, the so-called WiMAX standard is being discussed as new standard (IEEE 802.16) for regional radio networks. Having a theoretical range of up to 50 km and a very high data transfer rate, WiMAX surpasses the current WLAN technology which manages 3 to 6 km range in field applications.

The subterranean data transmission via a wireless local area network has a number of disadvantages. Thus, on the one hand, the network can only be used to a limited extent exclusively for critical applications such as, for example, for monitoring and remotely controlling machines. Other devices occupy a part of the available bandwidth which may have to be shared with the critical application. In the case of remote machine control, this can lead to uncontrolled conditions. In addition, in the case of a power failure in the mine or in the tunnel, communication between the hardware components of the radio network is no longer possible since at least the fixed components must be supplied with electrical energy for operating the fixed network. An interruption of the current-conducting line connections between components of the fixed network can lead to entire mine sections being disconnected from the wireless network communication. In addition, the situation in conjunction with controlling machines is such that, depending on the current operating situation in the tunnel or on the arrangement of vehicles and machines or the like, respectively, it cannot be ensured at any time that an RF connection can be maintained between the remotely controlled machine and the fixed network. As well, a fast change from one access point to a next access point is frequently not possible in the case of devices of the prior art. This is a disadvantage particularly in the case of mobile machines which are dependent on an uninterrupted network connection. The same applies if the network is used, for example, for telephony applications with moving persons. In addition, no data can be transmitted during the search for an access point which also leads to disadvantageous delays.

It is the object of the present invention to provide a method and a system of the abovementioned type by means of which it is possible to monitor the subterranean operation of machines at any time and ensure the remote control of the machines via the radio network with the highest possible availability of the radio network even in the case of disruptions. In addition, it is the object of the invention to adapt the general communication with mobile stations to the special subterranean requirements and simplify the monitoring of mobile stations so that rescue measures can be initiated rapidly and purposely in the case of an emergency.

To achieve the aforementioned objects it is provided in a first embodiment of the method according to the invention of the type initially described that during an interruption of the data transmission connection between the fixed network and a base station and/or an interruption of the radio link between the mobile station and the base station, a data transmission between the mobile station and the fixed network is effected via the separate base station and at least one further base station connected to the fixed network by means of an uninterrupted data transmission connection. As a result, the invention provides for data transmission even in the case of an interruption of the data link between the fixed network and the base station communicating with the mobile station, wherein the data transmitted to the separate base station are first transmitted to a further base station which has an intact data transmission connection to the fixed network. The interruption of the data transmission connection between the fixed network and the base station can be, for example, the consequence of a power failure or also the consequence of an interrupted network cable. In this context, the base stations can be connected both by cable and wirelessly to the fixed network in the operating state. By resorting to another base station connected to the fixed network via an intact data transmission connection as provided according to the invention it is possible to transmit data between the fixed network and the mobile station via the radio network even in the case of a power failure of a base station or a cable interruption.

In this arrangement, the mobile station can be arranged at and/or on a machine or it can be a portable mobile part, particularly a WLAN-capable IP telephone. For the rest, the situation is such that the method according to the invention can be used not only for subterranean data transmission but in any environment in which the use of wireless local area networks leads to comparable problems, for example in buildings or in industrial plants.

In a preferred embodiment of the method according to the invention, the data transmission between a separate base station and a base station connected to the fixed network is effected wirelessly via the radio network. A base station, which can be preferably an access point according to an IEEE 802.11 standard, basically has at least one transceiver device which is constructed for a wireless data transmission. In addition, a second transceiver device can be provided which can be allocated to a different direction of radiation or aligned in the direction of a transceiver device of an adjacent base station. Both transceiver devices are preferably not allocated to a particular application and are continuously on standby. Adjacent base stations are preferably arranged at a distance from one another which provides for the setting up of a (directional) radio link between the base stations. This makes it possible to transmit the data to be transmitted, in the case of an interruption of a data transmission connection between a base station and a fixed network, to an adjacent base station which has an intact data transmission connection to the fixed network.

The data can be, for example, data for monitoring and/or controlling a machine at and/or on which the mobile station is arranged. If, in the case of an interruption of the data transmission connection, data are transmitted from a base station to an adjacent base station which is already transmitting data to a mobile station or receiving data from the latter, it may happen that the data traffic which would take place via the data transmission connection to the fixed network in interference-free operation is mixed with the data traffic between the adjacent base station and a mobile station communicating with this base station. In this case, an information item can be transmitted to the mobile station which informs the mobile station that the normal operating state of the data transmission is disturbed which, for example, would infer an emergency case. In this context, the mobile station can automatically change an operating mode of the monitored or controlled machine so that it can correspondingly react to the emergency case. For example, in the case of an expected collision of the data traffic, the mobile station can automatically transmit a control information item to the machine having the mobile station which can lead to a reduction in the traveling speed of the machine.

The base station can represent a central unit which can have at least one access point, a switch, an OWG media converter and a possibly battery-buffered power supply, and one or a multiplicity of antennas. The base station is constructed in such a manner that the features of the method according to the invention described in detail in the text which follows can be implemented.

In the aforementioned embodiment, adjacent base stations are arranged at a distance from one another which provides for wireless data transmission by radio between the adjacent base stations. In a tunnel infrastructure, directional antennas are preferably used as antennas which provide for the greatest possible range within a tunnel. If the base stations have two separate transceiver units, it is possible to functionalize the base stations as bridge or as switch. Whilst a bridge connects two segments with one another in a computer network and divides the network into different collision domains, a switch enables more than two network segments to be connected in a local area network (LAN). The individual inputs of a switch can receive and transmit data independently of one another. Both a bridge and a switch allow data received on one side of the separate base station to be forwarded on the other side. This makes it possible for data transmitted to a separate base station to be forwarded by a multiplicity of further (separate) base stations in the manner of a hop function via the radio network. The hop-like forwarding preferably takes place until the data are transmitted to a base station which has an intact connection to the fixed network.

The forwarding of the data can take place with the aid of standardized methods, for example in a redundant ring-shaped network by means of the so-called Spanning Tree Algorithm according to IEEE 802.1D or in accordance with the sequences described in the text which follows and implemented at application level.

To reduce the duration of data transmission and to select the most efficient route possible for the data packets to be transmitted, it is preferably provided that a separate base station transmits a status enquiry to at least one further, preferably all further base stations connected wirelessly or by wire to the separate enquiring base station, wherein the status enquiry relates to the state of connection of the further base stations enquired from. This requires a corresponding program-related arrangement of the base stations. As a result, a separate base station transmits an enquiry to preferably all adjacent base stations which can be reached in order to obtain information about whether the adjacent base station in each case has an intact data transmission connection to the fixed network.

After the transmission of the status enquiry, the status enquiry can be transmitted continuously from the enquired base station to other base stations in the manner of an information chain. If a search enquiry made by a separate base station is transmitted back to the same base station, this does preferably not lead to the forwarding of the status enquiry. According to the invention, however, it is provided that the return transmission of a status enquiry is considered to be information about the fact that the base station returning the status enquiry is also separated from the fixed network.

In principle, it is also possible that after transmission of the status enquiry, the enquired base station generates status information and transmits it to the enquiring base station. Following a status enquiry made, it can thus be reported back that the enquired base station either has an interrupted or a non-interrupted data transmission connection to the fixed network.

The transmission of the status enquiry is preferably continued until the status enquiry is transmitted to a base station which has an intact connection to the fixed network. This base station reports the available network contact back to the enquiring base station, wherein the status information is preferably reported back, again in the manner of an information chain, in such a manner that all separate base stations have obtained information about the base station connected to the fixed network. This ensures that each base station separated from the fixed network is informed at least about a possible data transmission path for transmitting data between the fixed network and the mobile station.

When a fault state or an interrupted data transmission connection is detected, the first base station connected to the fixed network can transmit a message of the fault state to a central server, wherein the message can contain information about the base station separate from the network. This makes it possible to find and selectively repair an interrupted data transmission connection in a rapid and simple manner in the network. Similarly, it is possible that the availability of the subterranean base stations or network nodes is interrogated at regular intervals via a central server in order to control the operability of the entire network.

From the number of transmission steps or data hops in an information chain, the distance between a connected base station and a multiplicity of separate base stations can be determined in order to select the shortest possible connection and ensure the data transmission between the fixed network and the mobile station along the shortest possible way or with the shortest possible data transmission times, respectively.

In an alternative advantageous embodiment, it is provided that at least two, preferably all base stations are connected to one another via a data transmission line preferably connected to the fixed network, especially in the form of a ring, and that in the case of an interruption of the data transmission connection between the fixed network and a base station, a data transmission between the base station separated from the fixed network and at least one further base station connected via a non-interrupted data transmission connection to the fixed network takes place by cable via the data transmission line. At this point, the invention is based on the basic concept of connecting the base stations preferably in ring-form or meshed networks by means of permanently installed lines, wherein these connections also preferably have a much higher bandwidth than a radio link. If there is a line interruption between a base station and the fixed network, the data are transmitted via the data transmission line up to a further base station which is connected to the fixed network via an intact data transmission line. It is possible that a data transmission line is connected onward from base station to base station in the form of a ring and, as a result, an alternative access to the fixed network is provided via at least one base station. To provide for a ring-shaped connection of the base stations, each base station has at least two connections for a network cable, preferably a copper or OWG network cable. Data transmission between two base stations connected via the network cable can take place preferably in full-duplex mode, wherein the functionality of the base stations is not intended to be impaired by the data transmission.

To provide for further operation of the base stations for a predetermined period of time even when the power supply of a base station, normally effected via the fixed network, is interrupted, it is provided in a further alternative embodiment of the method according to the invention of the type initially described that in the case of an interruption of the power supply to the base station, provided via the fixed network or a separate power supply network in fault-free operation, a network-independent power supply is provided. For this purpose, each base station is preferably connected to a network-independent power supply device, wherein the base station can have an electrical energy accumulator, for example a battery. The energy accumulator ensures further operation of the base station for a relatively long period of time so that the data can continue to be transmitted between the fixed network and the mobile station via the base station. In addition, it is also possible, immediately after the interruption of the power supply of a base station, particularly after the start-up of emergency power operation, to transmit a status enquiry of the type described above to adjacent base stations in order to obtain information about the state of connections of adjacent base stations to the fixed network. In the event of a power failure, it is also possible, due to the emergency power supply of the base stations, to find alternative access to the fixed network via a ring-shaped data transmission line of the type described above, connecting the base stations directly to one another, in order to provide for the data transmission between the fixed network and the mobile station.

According to a further alternative embodiment of the method according to the invention, it is provided that, immediately after an interruption of the power supply to a base station, identification data and/or position data of at least one mobile station located within radio range of the base station before and/or after the interruption of the power supply, preferably of all mobile stations arranged within radio range, are determined and transmitted to the fixed network by the base station, preferably to a central computer of the fixed network. In addition to a status enquiry of the type described above and/or as an alternative thereto, it can be provided according to the invention that, after a power failure which is possibly attributable to a mine accident, all base stations directly transmit to the fixed network identification data of all mobile stations which were located within radio range of the base stations affected at the time of the power failure and/or were in radio connection with the base stations affected. If the transmission of identification data and/or position data is carried out by all base stations which are allocated to the fixed network, a comprehensive overview of the location of all mobile stations at the time of the power failure can be obtained. In the case where a power failure is attributable to an accident, the position of all miners equipped with a mobile station can be determined by the invention and transferred to the mine rescue corps. This can then immediately initiate selective rescue actions where it is possible to determine the position of the miners with an accuracy of a few meters, if necessary. An extension of this function now has an effect that a base station monitors particular devices or groups of devices under program control: after a particular time has elapsed within which a mobile device has not moved, an alarm is triggered either directly in the center or the mobile device is first alerted. If no acknowledgement button is pressed by the associated person following this alarm, the base station will trigger a central alarm.

After the transmission of the identification data and/or position data, further data transmission can be allowed only to a restricted extent in an emergency mode of the base station. The base stations then, in turn, provide for restricted network traffic which can also be restricted, for example, to transmitting text messages or possibly also to conducting telephone calls. This ensures that, in an emergency, the network will not be overloaded, with disadvantageous effects on the transmission of position data.

In the emergency mode, the position of all person-related devices is preferably determined cyclically and forwarded to a central computer of the fixed network, preferably to a central station. In this connection, it is also preferably provided that the identification data and/or position data can only be accessed in an emergency case and/or after authorization. This ensures that there is no misuse of the stored data.

It is also possible that identification data and/or position data are stored over a predetermined period of time and are transmitted continuously or only after an interruption of the power supply or in an emergency, respectively. As a result, the mine rescue corps can preferably access the stored data only in the case of an accident in order to obtain an overview of the location of persons. The access to person-related data is also preferably limited in time in order to comply with the demand for data protection by the miners.

In principle, the mobile station can also be arranged at and/or on a machine, wherein the machine can be moved, for example, in a tunnel in subterranean use. In this case, it is usually provided that the mobile station of the machine sets up a communication link with various base stations, or associates itself with these, within short time intervals. Due to the channel-related transmission method in a WLAN radio network according to IEEE 802.11, however, signal extinctions, and thus fluctuating communication quality, may occur in the case of moving machines. The consequence is that the moving machines can only be monitored and controlled to a restricted extent.

From the prior art, methods are known wherein, to ensure that the quality of communication between a mobile part and a fixed network remains as uniform as possible, two antennas are used which is called antenna diversity. Nevertheless, there are many operating states in mining and tunnel construction in which communication is temporarily impossible. This can be caused, on the one hand, by vehicles which are arranged between the machine and a base station or by devices which, possibly due to their own size, also block a radio contact temporarily between themselves.

In many cases, a remotely controlled machine must be stopped when it no longer has a radio link to the control center. After an interruption of the radio link, it is sometimes no longer possible to restart the machine.

To be able to monitor and control subterranean moving machines with greater safety and reliability it is provided in an alternative embodiment of the method described initially that at least two mobile stations are arranged at and/or on a subterranean moving machine and that, if necessary, data transmission takes place between the one mobile station and/or the other mobile station and the base station. According to the invention, a machine has two independent transceiver devices in this case. These can be combined in one device or mounted as two separate devices at and/or on the machine. A mobile station having one transceiver device preferably has two antennas, furthermore preferably directional antennas, wherein at least one antenna can be arranged in the direction of movement and at least one further antenna can be arranged in opposition to the direction of movement of the machine.

This facilitates the setting up and maintaining of a radio link between the mobile station at and/or on the machine and a base station allocated to the fixed network. For the networking of a multiplicity of mobile stations or of a multiplicity of transceiver devices at and/or on the machine, a bridging function can be provided which subdivides the connection into various segments and thus into collision domains. If the mobile stations are arranged in such a manner that data transmission between the machine and the fixed network is possible via two independent radio links, this also includes the provision of a number of transceivers or the utilization of different frequency bands by a correspondingly integrated device.

To provide for mutually independent data transmission between the mobile stations arranged at and/or on a machine and at least one base station of the fixed network, the mobile stations can be constructed and/or arranged with respect to one another in such a manner that a data transmission between the machine and the fixed network is possible via at least two different channels. To provide for a phase shift between two channels of the radio link, it can be provided to select a particular form of antenna or a particular type of antenna and different polarization planes of the RF signal or to arrange the mobile stations of the machine with corresponding spacing.

The data to be transmitted are preferably transmitted in principle or dependent on situation temporarily redundantly by the mobile stations of the machine, wherein preferably only the data first transmitted to a base station and received at the receiver are taken into consideration. To separate different functions within the multifunctional wireless network, it can be provided that the radio link between a mobile station and a base station is constructed as a virtual private data network (VPN) or as so-called virtual LAN (VLAN). A virtual private network is a computer network which utilizes a public network for transporting private data. Subscribers to a virtual private network can exchange data as in an internal LAN. Individual subscribers themselves do not need to be connected directly for this purpose. The virtual private network can provide the mobile stations with access to the fixed network via the base stations which are allocated to the fixed network. A VLAN is a virtual local area network within a physical network with the aid of which virtual networks can be separated from one another with respect to security, broadcast control and the like. VLANs can be connected to one another via routers. A widely used technical implementation of VLANs is partially defined in the IEEE 802.1q standard.

A further preferred embodiment of the method according to the invention provides that the signal quality of the data transmitted between the mobile station and a base station is determined, for example by means of a field strength measurement. In this context, it is preferably provided that the signal quality of the data transmitted from the mobile station to a base station is determined. If a machine moving subterraneously has at least two spaced-apart mobile stations, it is provided according to the invention that the signal qualities are determined for both mobile stations. The signal qualities determined can then be transmitted to the station sending the data, preferably from each data-receiving station. As a result, the signal quality of the incoming data and the signal quality of the own data sent out and received at the receiver is determined and reported to the sender. This makes it possible to make a decision, in dependence on the quality of connection, about the base station to which a mobile station is to set up a radio link or the base station with which the mobile station is to become associated and when a switch-over to another base station, so-called roaming, is performed, if necessary.

According to the invention, the machine preferably continuously obtains information on the signal quality of the data signals transmitted from the machine to each one of the base stations, signal qualities being determined and transmitted continuously. To ensure the highest possible quality of the radio link between a mobile station and a base station, it is also preferably provided that the signal quality of each base station or mobile station with a radio link to the mobile station or the base station, respectively, is determined. As a result, this means that for each mobile station, the quality of connection of each possible radio link with a base station arranged within radio range is determined and is utilized as basis for the association of the mobile station with a selected base station. If both the signal quality of the data transmitted from the mobile station to the base station and the signal quality of the data transmitted from the base station to the mobile station are determined and reported to the machine, the machine has information about the quality of connection both of the data signals sent by the machine and those received by the machine, for each base station with which it is associated. Depending on the signal quality of the radio links between the mobile stations arranged at and/or on the machine and at least one base station, a decision can be made about the mobile station via which the data are to be transmitted between the base station and the machine.

This decision is preferably made via a control device of the machine itself but, in principle, it is also possible that the radio link with the highest signal quality is selected for data transmission from the central station which can be, for example, a control room above ground, or from a base station. The signal quality can be reported to other base stations which are arranged within radio range of the mobile stations arranged at and/or on the machine. In this case, the mobile station transmits an enquiry to the base stations arranged within radio range in order to set up a radio link with a particular base station in dependence on the signal quality, following a corresponding response. It is thus decided at application level which connection can be utilized optimally.

Since the machine can always have two independent radio links with a base station, it is possible to carry out the current data transmission essentially without delay in dependence on the signal quality via one radio link and/or the other radio link. According to the invention, the interruption of the data connection, usually occurring in the case of a physical change during an on-going data connection from one base station to another base station, can thus be avoided. The best way in each case for transmitting the data packets from one or the other mobile station of the machine to the base station is selected by a correspondingly arranged control unit of the machine itself in order to ensure the transmission of the data packets with the lowest possible susceptibility for disruption in dependence on the quality of the connection. It can also be provided that a control room connected to the fixed network is informed by the machine controller about which of the mobile stations arranged at and/or on the machine is provided for the data exchange with the base station.

According to the invention, a base station is preferably a wireless access point as part of the topology of the fixed network. An access point is an active network component. In contrast to passive network components such as, for example, cables, an access point is capable of independently processing network data. If the subterranean data transmission between a mobile station and the fixed network is provided via a WLAN according to the IEEE standard 802.11, both the base stations and the mobile stations arranged at and/or on a machine can be constructed as 802.11 access points, according to the invention. According to the invention, access-point-capable hardware is thus also used on a subterranean moving machine. Since it is capable of maintaining connections to a number of external stations, explicit time-consuming association of a mobile base station with particular access points of the fixed network can be avoided.

In this context, one or more access points can be used on the machine so that, if necessary, a number of simultaneous connections to the fixed network can exist. These basic connections can also be used for exchanging the useful data between the machine and the fixed network. The useful data can be, for example, monitoring and/or control data. Both the fixed access points of the fixed network, involved in the data transmission, and the mobile access points provided at and/or on the machine can be arranged for independently deciding, possibly interactively, which connection is to be used for data transmission. It is possible to provide corresponding software which ensures that data transmitted several times cannot be forwarded or processed several times.

The susceptibility to disruption of the wireless transmission of a mobile station on an access point of the fixed network can be reduced by subterranean data transmission taking place via a WLAN according to IEEE 802.11a or g standard for subterranean use. This has the advantage that the information can be transmitted several times via subfrequencies of the frequency band used which considerably improves the susceptibility to disruption compared with a WLAN according to the 802.11b standard since, for transmitting data via a WLAN according to the IEEE 802.11b standard, the entire frequency band of a channel is utilized uniformly.

To provide for central control and monitoring of a subterranean moving machine, it is provided in a further alternative embodiment that the mobile station is arranged at and/or on a subterranean moving machine, that a base station determines the position of the machine on the basis of the data transmitted from the mobile station to the base station, preferably continuously, and that the base station transmits at least one position signal, identifying the position of the machine, to at least one base station which is adjacent in the direction of movement of the machine. According to the invention, it is possible that the base stations constructed as access points preferably continuously track the position of a subterranean moving machine. In this context, it is preferably provided that the position of a mobile station connected to the base station or to an access point via a radio link and/or the position of all mobile stations arranged within radio range of the base station is determined. The position of the machine can be determined, for example, by transmitting position data from the mobile station to an associated base station. In principle, it is naturally also possible that the setting up of a radio link between a mobile station arranged at and/or on the machine and a base station is already considered as information that a machine is located within radio range of the base station, and thus in the vicinity.

According to the invention, it is thus possible that the base stations track the traveling path of a machine, wherein a base station informs the immediately adjacent base stations, either via the radio network or via the fixed network, that a machine is approaching. To provide a sufficiently large bandwidth of the radio link for the data transmission from the machine to the base station in dependence on the situation-dependent communication requirement of the machine, it is preferably provided that with the setting-up of the radio link or also continuously during an existing link in active operation of the machine between the mobile station and a base station, at least one information item about the bandwidth requirement of the machine is transmitted to the base station. The bandwidth requirement changes, for example, when an operator takes over the machine manually for remote control. A bandwidth requirement is understood to be the volume of data which must be transmitted from the mobile station to the base station and conversely in connection with the monitoring and/or control of the machine.

The bandwidth requirement can be transmitted from the base station associated with the mobile station to adjacent base stations which leads to bandwidth being reserved automatically by the adjacent base station to the amount of the bandwidth requirement of the machine. For example, this can be done due to the fact that, with the transmission of the bandwidth requirement, no further connections can be set up between an adjacent base station and other mobile stations, for example PDAs or telephones. As soon as a machine leaves the radio coverage of a base station again and the RF radio link between the base station and the mobile station of the machine is interrupted, the base station can be switched back to normal mode. Bandwidth reservation is then cancelled. The situation-dependent bandwidth reservation is of advantage especially if a subterranean moving machine is to be operated manually from the fixed central station or a control room and, at the same time, is to be monitored, for example by digital video via a WLAN.

To provide sufficiently large bandwidth of the data transmission connection between a mobile station arranged at and/or on the machine and a base station for controlling and for monitoring a subterranean moving machine at any time, it is provided in a further alternative embodiment of the method according to the invention described initially that a prioritization of the quality of service of the radio network is provided, wherein the data packets transmitted from a mobile station to a base station are given higher priority than those data packets which are transmitted by further mobile stations, not allocated to the machine, to the base station. Data packets can be prioritized by means of certain features and characteristics. Prioritizing data packets prioritizes at the same time the respective connection transmitting the data packets. According to the invention, it is then provided, in order to ensure adequate bandwidth for the transmission of control and monitoring data, that the data packets transmitted from a mobile station to the base station can be transmitted and processed with priority. Naturally, prioritized processing also applies to those data packets which are forwarded in conjunction with the search for an alternative network access from a base station to an adjacent base station. If, for example, the mobile station is arranged at and/or on a machine, data packets relating to a bandwidth requirement of the machine are transmitted to the base station with priority. On the other hand, data packets having a lower priority are not transmitted, or only with delay. Similarly, it is possible that the transmission of data packets with lower priority is interrupted as soon as data packets with higher priority are transmitted.

In detail, there is a multiplicity of possibilities for arranging and developing the method according to the invention, referring, on the one hand, to the dependent patent claims and, on the other hand, to the subsequent detailed description of a preferred exemplary embodiment of the invention, with reference to the drawing. For the rest, it is pointed out that the invention, if necessary, allows the features mentioned in the claims to be combined with one another even if this is not described in detail.

The single FIGURE of the drawing shows a system 1 for subterranean data transmission between a multiplicity of mobile stations 2 of a subterranean moving machine 3 and a fixed network 4 via a wireless local area radio network 4a. In the example shown in the drawing, the radio network 4a is a WLAN according to the IEEE 802.11 standard. The fixed network 4 has a fixed central station 5 and a multiplicity of fixed base stations 6, constructed as access points according to the IEEE 802.11 standard, each base station 6 being connected to the fixed network 4 via at least one preferably cable-connected data transmission connection 7. The base stations 6 and the mobile stations 2 in each case have at least one transceiver device which is not shown in detail. The data transmission between the mobile stations 2 and the fixed network 4 is effected wirelessly for at least one base station 6 in the radio network 4a.

In normal operation, data are transmitted between a mobile station 2, which basically can also be a WLAN-capable IP telephone, and a central station 5, for example an above-ground office or a central control room, via a fixed base station 6 and further hardware components of the fixed network 4, particularly switches 8 and/or routers, bridges or the like, not shown in detail. To adapt the infrastructure of the fixed network 4 to the topology of subterranean constructions in a simple manner, the aforementioned components are preferably integrated directly into the base stations 6. An access point can be tied to a switch like another Ethernet port. From the point of running cables from switch to switch, this results in a line structure which logically resembles a switched tree structure. If the switch in the base stations 6 has more than two network connections, it can be used to branch off lines into branch tunnels and possibly build up meshed networks which can have great advantages for reasons of redundancy. The various networks are then separated preferably via the setting up of so-called VLANs as virtual local area networks in the switch of the base station.

If a power failure occurs, all hardware components of the fixed network 4 such as, for example, the base stations 6 and/or the switches 8, are without power which leads to an interruption of the data transmission connection between the fixed network and a currentless base station 6. The same applies to the case where a network cable is interrupted.

To provide for data transmission between a mobile station 2 and the fixed network 4 despite an interruption of the data transmission connection, it is provided according to the invention to provide between a base station 6 separated from the fixed network and at least one further base station 6 connected to the fixed network 4 via a non-interrupted data transmission connection, a direct data transmission connection between the adjacent base stations 6. Preferably, a radio link 9 is set up. In principle, it is also possible, according to the invention, to connect a multiplicity of base stations 6, preferably in the form of a ring, to one another by means of a network cable, wherein, in the case of an interruption of the data transmission connection 7, data transmission takes place between the base station 6 separated from the fixed network 4 and at least one further base station 6, connected to the fixed network 4 via a non-interrupted data transmission connection 7, via the network cable.

An alternative embodiment of the invention provides that in the case of an interruption of the power supply of the base station 6, provided via the fixed network 4, network-independent power is supplied. For this purpose, it is provided according to the invention that each base station 6 can have an electrical energy accumulator, for example a battery.

Due to the channel-connected transmission method of WLAN according to IEEE 802.11, signal extinctions, and thus fluctuating communication qualities, occur in moving machines 3 in subterranean operation. In addition, a radio link between a machine 3 and a base station 6 is partially interrupted or impaired by obstacles.

To track the movement of a machine 3 below ground and to be able to monitor and control a machine 3 with high safety and reliability, it is also provided according to the invention that a machine 3 has at least two mobile stations 2 which provide for data transmission from one mobile station 2 and/or the other mobile station 2 to a base station 6, if necessary. Depending on the quality of connection of the radio links between the mobile stations 2 and a base station 6, the machine 3 can then preferably make a decision regarding via which one of the two mobile stations 2 of the machine 3 a data transmission to the base station 6 is to take place.

As an alternative, the data transmission is carried out simultaneously or redundantly by both mobile stations 2 of the machine 3 to various base stations 6. It can also be provided that all data are transmitted to the machine 3 redundantly via two different routes to base stations 6 to which the machine 3 is currently connected via the mobile stations 3 from the central station 5, for example a central server or a remote operating unit for the machine 3. It can also be provided that only the data packet received first is taken into consideration whilst the data packet received subsequently is not considered. In this context, the various alternative sequences can be allocated and switched dynamically in dependence on the operating state of the machine and of the radio network. This is preferably done interactively between the mobile and central applications and the mobile and fixed infrastructure. In this context, the adjustments are influenced via the dynamic configuration of routers, switches, access points and mobile clients.

In the context of tracking the traveling path of a machine 3, it can also be provided that a base station 6 automatically determines the position of a machine 3 on the basis of the data transmitted from the mobile station 2 to the base station 6, preferably continuously, and generates a position signal which is transmitted or forwarded from a base station 6 to at least one adjacent base station 6. This informs an adjacent base station 6 even before a machine 3 arrives that a machine 3 is approaching the adjacent base station 6 and that a corresponding bandwidth must be provided by the adjacent base station 6 for transmitting data of the machine 3.

The system 1 shown preferably has as base stations 6 access points according to the 802.11 standard, preferably as combined devices according to the IEEE 802.11 a/g standard. Each access point has one or two wireless WLAN transceiver units according to the IEEE 802.11 standard. In addition, an access point can have at least one connection for a hardwired optical or copper-based network and possibly an inbuilt switch in order to be able to set up branches in the line structure of a tunnel network, and/or a routing function for the fixed network in order to be able to connect an access point to the fixed network simultaneously with a number of different concentrators, for example switches. Each transceiver unit can have at least one inbuilt antenna or pair of antennas and/or one possible connection for at least one external antenna.

In addition, it is provided according to the invention that an access point is correspondingly constructed for use in the method according to the invention. In this context, an access point can have a function for independent search for fixed-network connections or available connections to the fixed network in the case of a power failure, wherein the search can take place preferably via the radio network. In addition, software functions for eliminating information packets which have been transmitted simultaneously to two access points are of advantage. In addition, functions can be provided for storing the mobile devices associated with an access point so that these can be transmitted to central systems permanently and/or in the case of a power failure. For the rest, an access point should have a function for receiving bandwidth requirements of prioritized devices and for blocking and deliberately terminating connections with lower prioritized quality of service when receiving a prioritized bandwidth requirement. Finally, routing functions can be provided for facilitating the communication with machines which are equipped with two WLAN mobile stations.

An access point can be automatically configured by a central system or manually from a web browser. For the rest, a storage function can be provided for storing identification data of the mobile stations associated with an access point, for an adjustable period of time in order to be able to transmit the identification data to the fixed network 4 or the central station 5 in the case of hazards. This ensures that the locations of persons which are in possession of a portable mobile station 2 can be called up by authorized personnel only when the transmission has been requested by the authorized personnel after a hazard event. For example, images of the movement of persons are not accessible in normal operation by this means but only when they serve for the protection of body and life of the persons.

To ensure the greatest possible security of transmission, an access point can be used with two separate frequency bands. A frequency band, for example 2.4 GHz according to the IEEE 802.11 b/g standard, can be provided for general network traffic, for example Internet, Intranet, telephone connections, PDAs or the like, this standard being used by all conventional WLAN devices. The data exchange with machines 3 can be carried out preferably according to the IEEE 802.11 a standard in the 5 GHz frequency band. This frequency band is only used by special devices so that interference or overlaps with other more widely used devices are very improbable. For this purpose, an access point has preferably two separate transceiver devices, both of which can handle types of communication independently of one another. 2.4 GHz and 5 GHz WLAN transceiver devices can be connected at a switch of the access point as separate network users. On the one hand, this enables the data traffic to be separated on the side of the wire-connected network, wherein the data of the 5 GHz WLAN, to be exchanged with the machines, are "wired" to a particular external Ethernet port and all data of the 2.4 GHz WLAN can be "connected" to another external Ethernet port. As a result, a single device can be used for both types of communication. The said frequency bands apply to the European situation. Naturally, other transmission standards can also be used and will not depart from the context of the invention. The experts will understand that the frequencies and standards mentioned here are examples and can convert the corresponding radio networks into other frequency bands and standards.

Apart from its basic functions of transmitting information between fixed and mobile devices as described, the WLAN access point can also handle other functions by installing additional devices in the access point. These additional devices then handle functions of automation technology or of applications. They are installed in the access point in order to be able to improve, e.g., the power supply or the protection against environmental influences. Such devices can be, for example:

fixed navigation and position finding aids for personnel, mobile machines or mine surveying purposes such as position transmitter or radar reflectors.

fixed readers for material identification such as e.g. scanners, active and passive RFID readers etc.

computers or measuring instruments for monitoring the air quality in the tunnel.

As the basic component of the system for wireless subterranean data transmission, the access point often already represents a small computer. According to the present invention, the computer capacity of the access points is enlarged so that they can additionally handle functions in the use below ground. This is important especially since each additional device in hard below-ground use represents an additional source of disturbance and can lead to decisive parts failing due to such a disturbance. In addition, due to the extensive protection measures, any further device can only be protected with expensive housings resulting in additional cost expenditure.

The access point can thus also be constructed as a modular computer itself which handles the task of the access point as one of many tasks in the infrastructure of an underground building structure. Such additional tasks can be, for example:

sending out auxiliary information for the precise navigation and positioning of vehicles, machines and personnel.

receiving and interpreting information for tracking material which is read in, e.g., by optionally connected additional devices such as e.g. laser scanners or RFID tags.

generating and forwarding positioning information, e.g. to servers above ground which is read in either via the WLAN itself or by optionally installed or connected additional devices.

communicating with central systems in accordance with open standards of the mining industry or in any proprietary processes.

receiving and mathematically processing weather information (information, e.g. on the air quality, temperature, humidity and on the airflow in the subterranean facility) for forwarding to corresponding computers or for network-based control of the ventilation.

processing the weather information and requesting fresh air to meet the demand of the number of persons and (possibly diesel-operated) machines which are located in the area of the access point. The ventilation systems can thus be controlled to match demand: energy costs are saved since only minimum ventilation is necessary when there are no persons in the corresponding areas.

receiving, monitoring and forwarding water-keeping information.

generating (possibly initially anonymous) information on the movement of persons and monitoring the movement of persons so that in the case of an emergency (for example, if a person who has had an accident has not moved over a certain period of time) the person or a central station can be informed in order to inform colleagues close by.

generating information on the "last known position" of persons below ground. In the case of an emergency, this information can be used, for example, for initiating purposeful rescue measures. In the case of an emergency, the resultant gain in time can save lives.

generating information and processing it for determining the position of the mobile stations by means of triangulation (measuring the different signal strengths) and/or trilateration (signal TOF measurements (time of flight)).

This comprises the construction of a base station as a computer which contains not only a firmware predetermined by the manufacturer of the access point, but also a program control (software) accessible to application programming;

these memories can be combined in separate control devices or together in one control device.

This program control in conjunction with a base station is also appropriate since much of the information gathered locally only makes application-related sense in a factual and functional context, possibly together with network information. The closer to the process itself that this processing takes place, the less the bandwidth needed in the network since it may also be possible to omit cyclic transmissions completely and, as an alternative, an event-controlled transmission, triggered by the computer in the access point, to receivers specified under program control can take place.

Examples of advantages of different embodiments of this integration are:
- disturbances in the ventilation, e.g. caused by a passing machine, can be detected by the computer due to the simultaneous connection of the access point to the machine, and masked out as irrelevant to processing.
- transport units detected by the RFID reader can be allocated to a train simultaneously connected to the access point.
- station-dependent assessment of movement information: if a miner carries a network device, changes in the field strength can infer movement. If there is no movement of the device over a certain period of time, the access point alerts the carrier of the device (e.g. by means of a "call") which must be accepted by the carrier. If this does not occur, the access point alerts a central system so that, if necessary, rescue measures can be initiated. Since the information is not transmitted to a central system before this time, the system does not allow a conclusion of "monitoring" of the personnel which would be relevant from the point of view of data protection law.
- switching-on and -off of the ventilation and/or of the illumination and/or other resources, etc., only when persons or machines are registered by a base station.

This processing offers special advantages particularly for information to be detected and processed in a decentralized manner and which does not justify a separate process computer or data communication.

Furthermore, the computer can also be used as network bridge to other access points. In this context, the computer must be equipped preferably with two different wireless LAN or other wireless interfaces. In this way, the computer can also represent a wireless "bridge" to other corresponding devices as already described above. This makes it possible to extend the range of radio coverage without having to extend the accompanying infrastructure, e.g. in the form of optical or copper-based network cables. If such devices are supplied with power, e.g. from power generators, fuel cells or accumulators, this area does not even need a power supply.

This is of particular interest since in the continuously changing infrastructure of underground structures, there are always areas in which the corresponding infrastructure does not (yet) exist or can only be provided temporarily by extreme costs.

In this case, the bridge function can also be handled by another device (not used as dedicated access point). It is then possible to conduct e.g. telephone calls from an IP telephone via a machine (which, in turn, is also a "client") or a number of machines as "relay station(s)" to the next device with a tie to the fixed network. This method is also known as mesh networks.

Analogously to the construction of a network bridge with an access point independently supplied with power, mobile stations can also be modified as network bridge to other devices. In this arrangement, mobile devices also handle the task of a network bridge.

A WLAN-equipped machine can thus be used as "relay station" or as "bridge" for other devices (e.g. persons equipped with telephone or PDA), which are even farther away from a fixed infrastructure.

The electronic modules described such as, for example, the computer, can be cold-started by means of a method according to the present invention. If an access point is in operation below ground, this modular device represents a potential fault source. Now and then, conditions occur which cannot be reproduced in every case. These conditions can often be eliminated again by a simple switching-off and -on again. Resetting is often not sufficient for this purpose since many registers, particularly in hardware chips, are deleted completely when the power supply is switched off. To be able to switch a below-ground device off and on again, authorized persons must frequently travel long distances. To this is added that the devices are frequently not provided with on-/off-switches. The electrician must thus first disconnect the power supply and then connect it again. According to the method according to the invention, the computing device with the access point can be remotely powered down as follows:

1. at least one or a number of electronic modules in the access point can be separately addressed via the network.
2. at least one of these modules receives the command to power down the device and to start it again from a computer above ground.
3. this module triggers, via a digital output or via another communication interface, a relay/switch or an electronic relay in the power supply which powers down the entire device.
4. immediately after the switching-off, or with a (possibly adjustable) time delay, the (electronic) relay releases the entire power supply again and starts the individual modules of the access point either jointly (simultaneously) or in a preset sequence.

In the close vicinity of an access point used below ground, there are typically a number of actuators such as, for example, switches and valves which are operated or controlled remotely. The installation of rugged, DC- and safety-(EX) decoupled inputs and outputs can thus be seen as an extension of the functionality according to the method. Digital or analog information can thus be input directly into the device or devices in the close vicinity of the access point can be supplied with control commands or setpoints.

It is also possible to link up transmission interfaces (possibly used in mining). The corresponding standard-compliant data formats are then generated directly in the access point. Such interfaces are, for example, serial couplings according to the German mining operations sheet or Ethernet-based standards, e.g. based on XML.

The direct linking of sensor and actuator signals can also be extended to the linking of wireless sensors and actuators. The access point thus represents the access to the fixed infrastructure of the wireless sensor networks, by means of which information of all types (e.g. on temperatures, humidities, pressures etc.) is to be read in from the underground process for process control. Such a sensor network can be arranged in a form such that the information from sensors farther away from the access point is conducted via those closer to the access point as a result of which the entire unwired sensor network obtains access to the infrastructure.

As an alternative to exemplary embodiments described, which uses redundant connections, a method according to the present invention having the designation roaming can also be used.

To additionally increase the reliability of transmission and the availability, a further exemplary embodiment according to the present invention has the function of automatic handing-over or roaming. In this context, a moving mobile device is handed on by a fixed access point of a network to a nearest access point of the network. The network is preferably a WLAN. This roaming makes it possible to maintain the connection between the mobile device and the network or its access points as constantly as possible.

The roaming described is achieved by means of a method according to the invention.

It is known that a mobile part holds onto a connection to an access point until it breaks off. Following this, the mobile part starts a search for alternative access points in order to establish a new connection. During this process, all available channels are scanned. Then the best channel for the connection respectively released is selected. This connection is then activated and data can be exchanged between the mobile part and the network via the access point. However, this procedure occupies a period which is too long particularly for use on mobile machines. In addition, there can be no data exchange during the searching process.

In this context, the method according to the present invention comprises the following steps:
1. step of detecting: continuous detecting of at least one parameter for the quality of the received signal between the mobile part and the access point. The signal quality is designated by $I_{CURRENT}$. If this drops below a certain threshold value $I_S$ which is adjustable by the user, the second step of the method is initiated.
2. step of searching: after the signal quality has dropped below the threshold value, the step of searching for a new access point begins. The step of searching occurs simultaneously with the data transmission or briefly interrupts the data transmission for a very short period of time.
3. step of detecting: detecting the signal quality of the access point found, which is designated by $I_{NEW}$.
4. step of comparing: comparing $I_{CURRENT}$ and $I_{NEW}$. If the signal quality of the access point found is better than the signal quality of the current access point, that is to say $I_{CURRENT} < I_{NEW}$, step 5 is initiated.
5. step of switching over: switching the mobile part from a current channel, that is to say the current access point, to a new channel, that is to say an access point.

The threshold value $I_S$ is adjusted in such a manner that the connection can still be kept stable when the threshold value is reached.

To determine the signal quality, different methods can be used, e.g. the field strength of the signal, number of the signs of life expected and actually obtained within a defined period of time (heartbeat, beacons, or the like) from a base station (lost beacon rate), the signal/noise ratio or the packet error rate.

The step of searching can be integrated in the data transmission. The step of searching can thus be carried out more efficiently. This step can be restricted for each configuration to those channels which are used by the network. Since usually only a few channels (e.g. three of 13) are used, this accelerates the entire searching process.

To further accelerate the step of searching, particularly when the searching process must interrupt the data transmission, the searching process can be carried out in individual steps and a data transmission can take place between each individual step. Thus, e.g.: DATA EXCHANGE→search on channel 3→DATA EXCHANGE→search on channel 11→DATA EXCHANGE.

A method for location-dependent roaming according to the invention is an alternative roaming method. This method can be used, in particular, when the machines are used in known areas of deployment or mine buildings, respectively. In this method, no steps of searching are carried out, that is to say search routines are omitted.

In this method, the area of deployment must be surveyed in a first step before the automated machine is used. In this process, the position and the intensity or field strength of the associated channels and access points prevailing at the position are preferably detected. These data can then be used for generating a field strength map of the area of deployment surveyed.

The surveying can be done both with the machine to be used and with another vehicle. The field strength map can be stored, for example, in the form of a table wherein the table then has assigned to each position corresponding information relating to the access points. For example, the position is detected at which a channel or access-point switch-over is to be performed and the identification of the access point to which the connection is to be switched over.

Thus, the field strength map contains information about the expected conditions of reception of a mobile part at certain positions in an area of deployment. This field strength map is conveyed in an electronic form to a control unit of the machine before an automatic trip.

The position of the machine is continuously checked by means of a suitable measuring device, a device for determining the respective position. The measured position is continuously compared with the field strength map. If the machine then reaches a position at which a channel or access-point switch-over is to be performed, this is detected by the machine control and the switch-over is carried out. This switch-over occurs rapidly and therefore leads to barely perceptible roaming.

The said field strength map forms one aspect of a stored table wherein one or more preferred base stations are allocated to these locations and field strengths in each case directly (per position of the mobile station) or indirectly (calculation of the field strength at the location of the mobile station via the position of the base station).

Both roaming methods described can be used both by themselves and jointly and particularly in combination with the redundant communication method.

A further alternative possibility for operating below-ground radio systems is the utilization of MIMO technology according to the future standard IEEE 802.11 n. MIMO designates a multiple-input/multiple-output transmission system. This makes it possible to reduce interference occurring below ground. Interference is produced by the multiple propagation of radio waves through the reflections occurring at the tunnel walls.

In this alternative, a number of n differently oriented antennas are used at a transceiver module. These are used for receiving the received signal several times (multiple input) and the transmit signal is output several times (multiple output).

Used underground, this technology reduces the reflections continuously produced at the tunnel walls and thus represents an essential technical means for achieving good connection qualities with long ranges.

The method according to the invention provides that the MIMO technology can be used in the access point and/or in the mobile part. This applies especially with directional antennas which were specially optimized for underground use.

In this arrangement, MIMO in underground use can also be used simultaneously with a number of different transceivers in connection with redundancy of transmission.

In conjunction with the methods of roaming and of transmission redundancy represented above, this further optimizes the underground use of wireless networks.

The invention claimed is:

1. A system for subterranean wireless data transmission between at least one mobile station and a fixed network by means of a radio network, wherein the fixed network comprises a number of fixed base stations each base station being connected to the fixed network by means of at least one data transmission connection, or directly to an optical waveguide network, wherein each base station and the mobile station in each case comprise at least one transceiver device and the data transmission between the mobile station and the fixed network is effected wirelessly in the radio network via at least one base station, wherein the system comprises at least one additional device for handling underground-specific network or application functionality, and wherein the base station can be used at the same time as the fixed station for including said additional device in order to couple sensor data from an underground process, transmitted by wire or wirelessly, to the network wherein in the case of an interruption of a power supply to the base station, a network-independent power supply is provided and wherein immediately after an interruption of the power supply to a base station in an emergency mode, identification data and/or position data of at least one mobile station located within radio range of the base station before and/or after the interruption of the power supply are determined and transmitted to the fixed network by the base station.

2. The system as claimed in claim 1, wherein the system comprises at least one additional device for handling underground-specific network or application functionality comprises at least one sensor, in particular chosen from the group of switches, media converters, RFID readers, switching or analog outputs and receivers for sensor networks.

3. The system as claimed in claim 1, wherein, in the emergency mode, after the transmission of the identification data and/or position data of the base station, further data transmission is allowed only to a restricted extent and/or in that identification data and/or position data are determined, and transmitted to the fixed network, cyclically and/or in that identification data and/or position data are stored over a predetermined period of time and are transmitted continuously or only after an interruption of the power supply.

4. The system as claimed in claim 1, wherein one or more parameters of signal quality of the data transmitted between at least one mobile station and at least one base station is monitored in dependence on events or in predetermined or dynamic time intervals and wherein the signal quality is used for determining a position of the mobile station, on the one hand, and/or a change in the signal quality is used for determining a direction of movement of a moving mobile station, on the other hand.

5. The system as claimed in claim 1, wherein the mobile station has a device for a respective position determination and a stored table in which information on the base stations preferred in each case is stored for the said positions which can be assumed and determined, so that the base stations to be connected in each case can be selected in dependence on the respective position.

6. The system as claimed in claim 1, wherein the mobile station continuously detects a quality of the received signal of the base station connected to the mobile station and, when it drops below a predeterminable threshold value, in a subsequent search step, a quality of the received signals of the base stations not connected to the mobile station, and subsequently switches the mobile station to the base station having the highest quality, and/or whether a redundant data link is used or not.

7. The system as claimed in claim 1, wherein the base station can be reached via two independent network connections and the system can be switched off and on via a corresponding command of a remote computer via one of the said network connections with the aid of cold-start electronics for switching the system off and on again.

8. The system as claimed in claim 1, wherein the radio network uses a WLAN with the 802.11 standard.

9. The system as claimed in claim 1, wherein the number of fixed base stations are embodied as access points.

10. The system as claimed in claim 1, wherein each base station is connected to the fixed network by a cable.

11. The system as claimed in claim 4, wherein the signal quality is used for determining the position of the mobile station via a comparison with a reference signal value.

* * * * *

UNITED STATES PATENT AND TRADEMARK OFFICE
CERTIFICATE OF CORRECTION

| | | |
|---|---|---|
| PATENT NO. | : 7,974,658 B2 | Page 1 of 1 |
| APPLICATION NO. | : 11/884395 | |
| DATED | : July 5, 2011 | |
| INVENTOR(S) | : Christoph Hunziker | |

It is certified that error appears in the above-identified patent and that said Letters Patent is hereby corrected as shown below:

Column 19, Line 14, Claim 1, "stations" should read -- stations, --

Column 19, Line 28, Claim 1, "network" should read -- network, --

Signed and Sealed this
Eighteenth Day of October, 2011

David J. Kappos
*Director of the United States Patent and Trademark Office*